June 25, 1929.  C. F. SHERWOOD  1,718,385
SCREEN
Filed Jan. 24, 1922
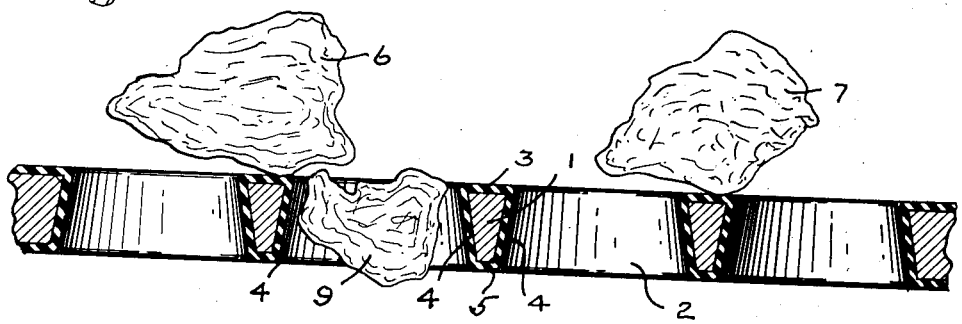
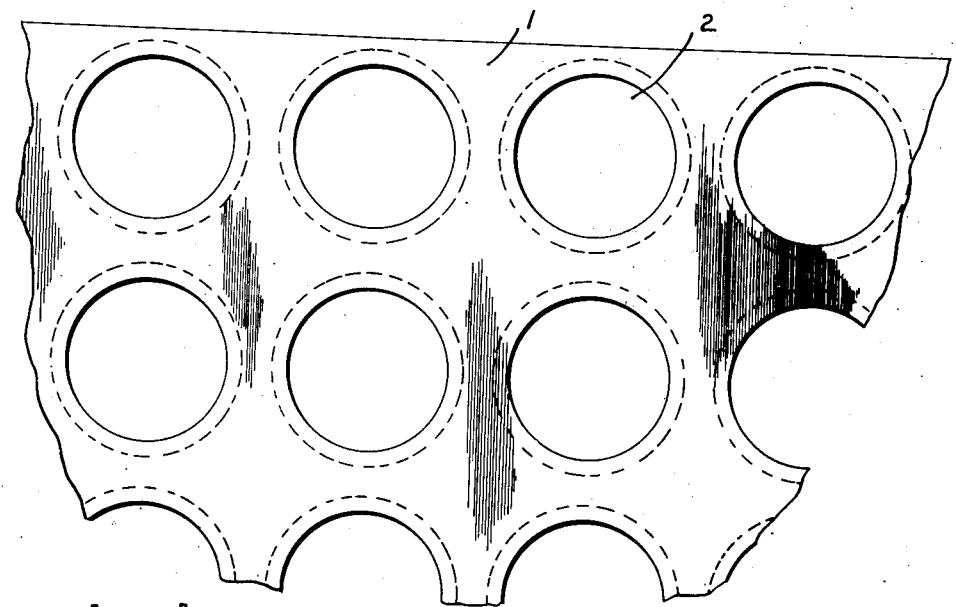
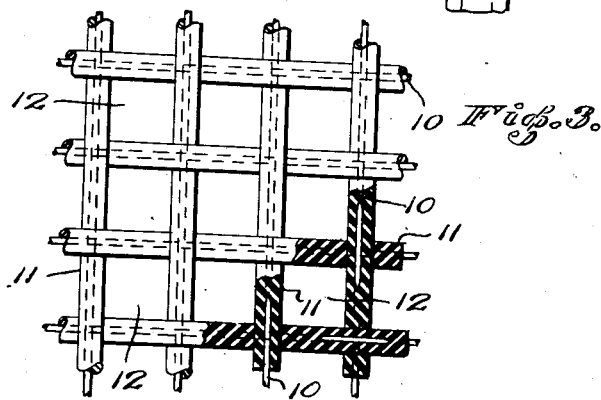
INVENTOR.
Charles Frederic Sherwood
BY Aw Boyken
his ATTORNEY Patented June 25, 1929.

1,718,385

UNITED STATES PATENT OFFICE.

CHARLES FREDERIC SHERWOOD, OF MILL VALLEY, CALIFORNIA, ASSIGNOR TO OLIVER-SHERWOOD CO., A CORPORATION OF CALIFORNIA.

SCREEN.

Application filed January 24, 1922. Serial No. 531,379.

My invention has for its object the production of a screen constructed and adapted to be used for materials which ordinarily have an abrasive or corrosive action upon screens as they have heretofore been made. In the screening of ore, rock, chemicals, coal and the like, strength in the screen material is required and this results in the employment of a material which is particularly susceptible to abrasive action. The sharp corners of the matter being screened causes a cutting action in the steel, bronze or other screen material, which results in early destruction. By my screen this destruction is avoided and the life of the screen greatly increased.

Another object is the production of a screen in which particles of the material being screened will not become wedged, thus clogging the screen against efficient action.

Another object is a screen resistant to the corrosive action of acids and alkalis.

These and other objects I accomplish by employing a material of relatively high tensile strength for the body of the screen and then surrounding such material with a surface of rubber or other composition having a high elasticity. By the combination of the body material and the elastic material, I produce a screen exceptionally resistant to abrasion or wear. The body material may consist of sheet steel bronze, hard rubber or the like, and is for the purpose of adding stiffening or reinforcement to the rubber which usually entirely surrounds the body material, covering both the screen surfaces and side walls of the interstices. It will thus be seen that the metal of the screen is completely protected against corrosion by acids or alkalis, while the rubber surface will at the same time form a cushion for the particles passing through the screen, as well as allowing such particles to free themselves because of the elasticity of the rubber walls within the area of the mesh, thus preventing excessive abrasive action as well as corrosion of the metal.

A rubber surface is particularly adapted to screening wet or slimy substances. By the use of rubber under such conditions, the liquid acts as a lubricant for the free passage of the substance through the screen with a minimum amount of friction and consequently a relatively long existence for the screen.

By referring to the accompanying drawings my invention will be made clear.

Figure 1 of my invention shows in cross section the screen body material and a rubber coating thereon.

Fig. 2 is a plan view of Fig. 1.

Fig. 3 is a view partially in elevation and partially in section of a modified form of my invention.

Throughout the figures similar numerals refer to identical parts.

The numeral 1 indicates a metallic screen formed of a steel plate having a plurality of holes 2 punched therein of a slightly larger size than the size of the material which it is desired shall pass through the screen. Over the entire surface of the screen I flood, flow, deposit, vulcanize or otherwise coat the metal surface with elastic material such as rubber, the said rubber extending over the surface of the plate at 3 around the walls of the meshes at 4 and over the bottom surface of the screen as at 5. In the cases where the screen is to be employed for relatively large particles and the mixture to which it is chemically neutral, it may not be necessary to extend the rubber over the under-surface 5 but only to coat those parts of the screen which come into contact with the cutting edges of the material to be screened.

Referring particularly to Fig. 1, a relatively large particle which will not pass through the mesh of the screen is shown at 6 and another at 7, and at 8 is shown a piece of material which will just pass through the screen.

It will be obvious that the upper surface of the rubber or other elastic material 3 will receive all of the impact and abrasive action of the sharp corners of the particles 6, 7, and that the walls as 4, 4 of elastic material within the meshes or holes in the plate 1 will be exposed to the sharp edges and corners as the particle 8 will pass through these holes. The rubber will not be cut by the sharp points but will permit the free passage and ready handling of the sharpest material without cutting, whereas the plate 1 if unprotected by the said elastic coating would be rapidly eroded. Where the screen is to be employed with mixtures having an acid or alkali reaction, it is obvious that the coating of the metallic plate 1 by the rubber will prevent the said corrosion, and even after the rubber surface has partially worn through will greatly retard the said corrosion, thus efficiently prolonging the life of the screen.

In the embodiment of my invention shown in Fig. 3, the screen comprises a woven mesh of metallic material 10, the entire exposed metallic surface of which is covered with a rubber compound 11, leaving the meshes 12 open for the passage of the material being handled and bounded completely by rubber.

I claim:

1. A screen comprising foundation material having a relatively high tensile strength in which a plurality of openings are formed, a layer of relatively elastic, abrasion-resisting material disposed on each side of said foundation material, the said layers of elastic material being united to each other through and around the edges of the openings, thus completely sealing the foundation material within the elastic material.

2. A screen comprising foundation material having a relatively high tensile strength in which a plurality of openings of conical shape are formed, a layer of relatively elastic, abrasion-resisting material disposed on each side of said foundation material, the said layers of elastic material being united together through and around the edges of the openings, thus completely sealing the foundation material within the elastic material.

3. A screen comprising foundation material having a relatively high tensile strength in which a plurality of openings are formed, a layer of relatively elastic, abrasion-resisting material disposed on said foundation material, and extending through and around the edges of the openings to form conical openings surrounded by elastic material.

4. A screen comprising foundation plate having a relatively high tensile strength in which a plurality of openings of conical shape are formed, a layer of flexible, abrasion-resisting material disposed on said foundation plate, and extending through and around the edges of the openings.

5. A screen comprising foundation plate having a relatively high tensile strength in which a plurality of openings are formed, a layer of rubber covering said foundation plate including the surfaces thereof formed by said openings.

6. A screen comprising foundation plate having a relatively high tensile strength in which a plurality of openings are formed, a layer of rubber covering one side of said foundation plate and extending over and around the edges of the openings.

7. A screen for sizing lumps of coke and similar hard material comprising a reticulated metallic structure having secured thereto a rubber coating adapted to protect the metallic structure from the abrasive action of the materials handled thereby and thus prolongs the useful life of the screen

CHARLES FREDERIC SHERWOOD.